United States Patent [19]

Sims

[11] 4,349,438
[45] Sep. 14, 1982

[54] OIL REFINER

[75] Inventor: Loyie Sims, Santa Ana, Calif.

[73] Assignee: Sims Oil, Inc., Newport Beach, Calif.

[21] Appl. No.: 281,338

[22] Filed: Jul. 8, 1981

[51] Int. Cl.³ ........................ B01D 35/18; B01D 3/28
[52] U.S. Cl. .................................. 210/180; 210/184;
210/238; 210/443; 196/46.1; 196/128
[58] Field of Search ............... 210/168, 180, 184, 185,
210/186, 232, 238, 436, 443, 444; 196/46.1, 128

[56] References Cited

U.S. PATENT DOCUMENTS

| | | | |
|---|---|---|---|
| 2,173,631 | 9/1939 | Neidens | 210/180 |
| 2,428,939 | 10/1947 | Morris | 210/180 |
| 2,713,422 | 7/1955 | James | 210/184 |
| 2,756,568 | 7/1956 | Jordan | 210/184 |
| 2,839,196 | 6/1958 | Schwalge | 210/180 |
| 2,902,158 | 9/1959 | Muller | 210/184 |
| 2,945,911 | 7/1960 | Murray | 210/184 |
| 3,616,885 | 11/1971 | Priest | 210/180 |
| 3,915,860 | 10/1975 | Priest | 210/184 |
| 4,006,084 | 2/1977 | Priest | 210/180 |
| 4,146,475 | 3/1979 | Forsland | 210/180 |

*Primary Examiner*—Ernest G. Therkorn
*Attorney, Agent, or Firm*—Charles H. Thomas

[57] ABSTRACT

A bypass oil refining device for an internal combustion engine is separated into lower and upper portions having a disposable cartridge containing a porous filtering material and a vaporization chamber, respectively. The improvements include a casing which has a stationary upper portion with an oil inlet, an oil outlet and a vapor vent. The lower portion is removable and is releasably secured to the upper portion. The lower casing portion contains a disposable filter cartridge. A vaporization plate completely separates the filter cartridge from the vaporization chamber so that oil filtered by the filter cartridge can reach the vaporization chamber only by means of a narrow central conduit which leads to an atomization screen through which oil is atomized and laterally dispersed into the vaporization chamber. A vent includes a check valve to prevent air from flowing into the vaporization chamber and to prevent oil from leaving through the vent should the oil level rise into the vent. The vaporization plate is formed with a raised center and concentric, descending tiers, the peripheries of which are configured to guide cascading oil into downward spiral paths of flow to increase the time during which oil is heated in the vaporization chamber.

18 Claims, 9 Drawing Figures

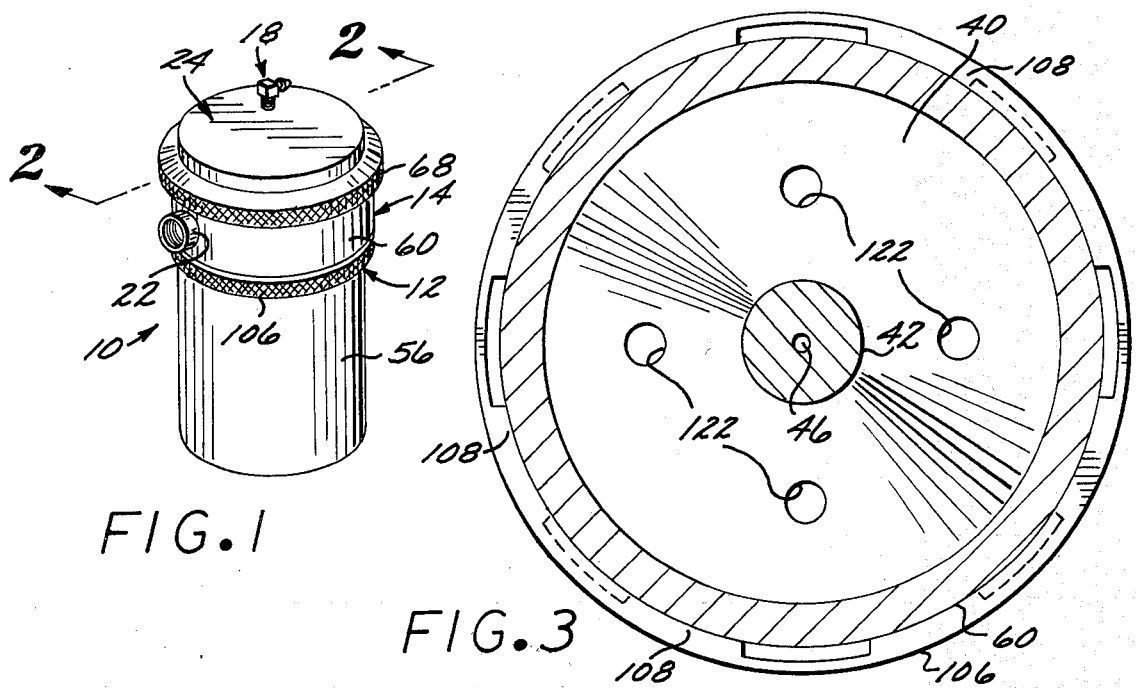
FIG. 1
FIG. 3
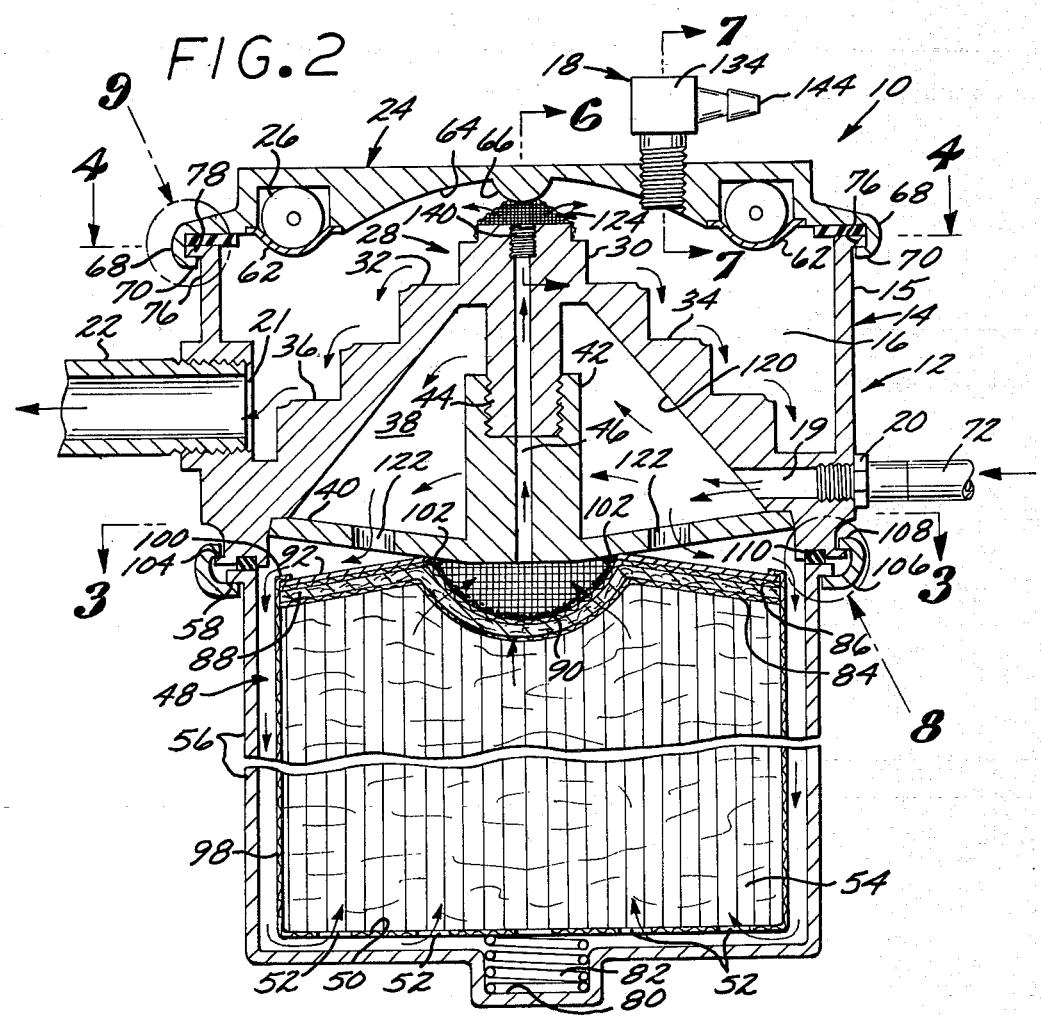
FIG. 2

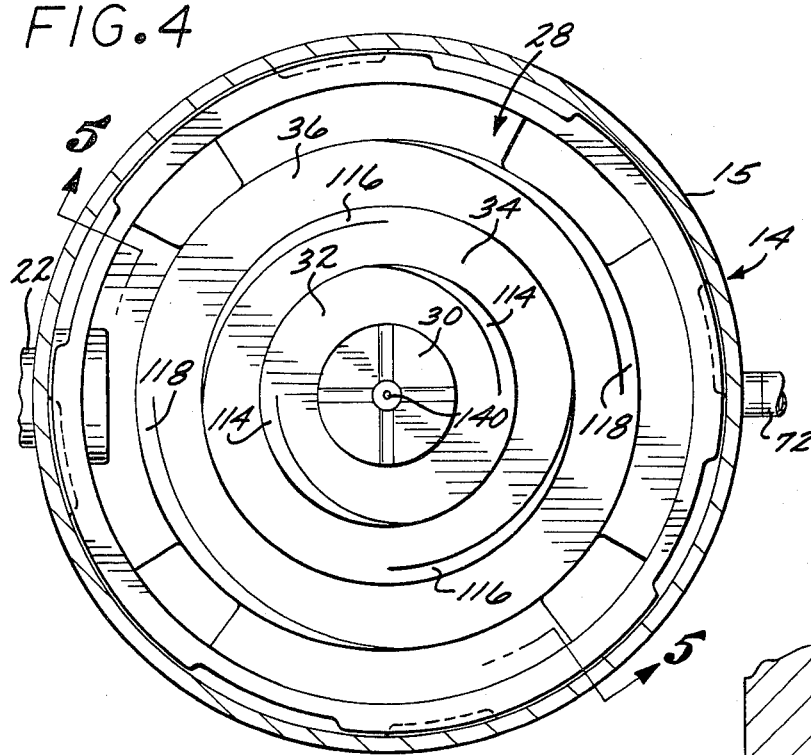
FIG. 4
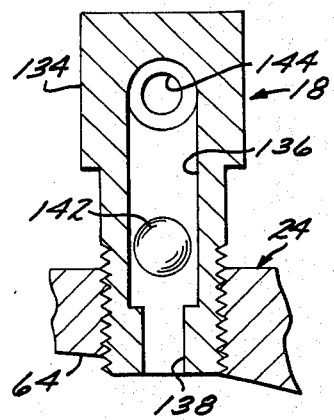
FIG. 7
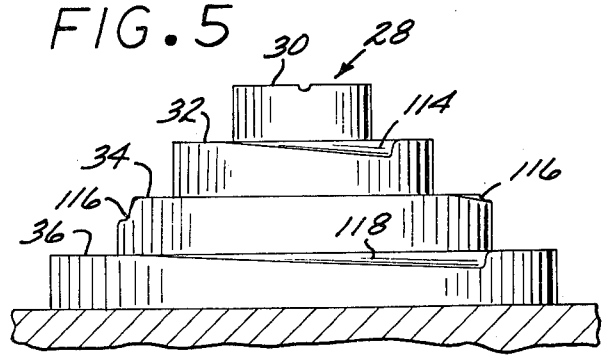
FIG. 5
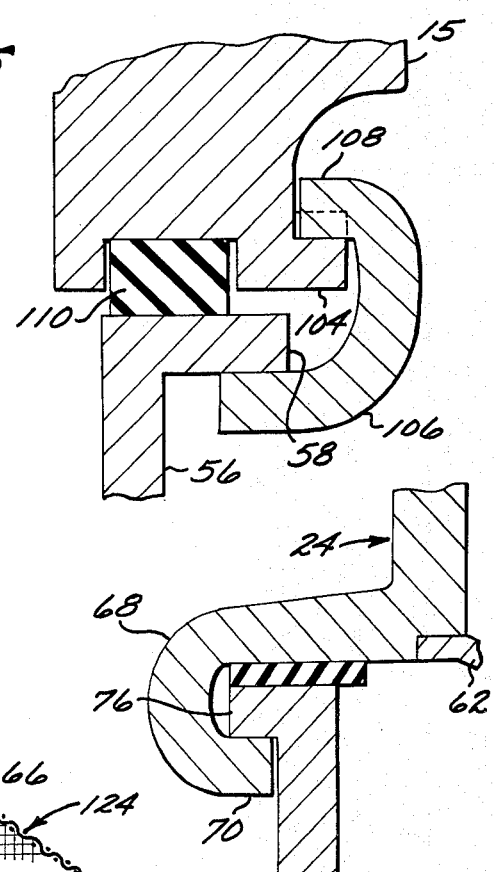
FIG. 8
FIG. 9
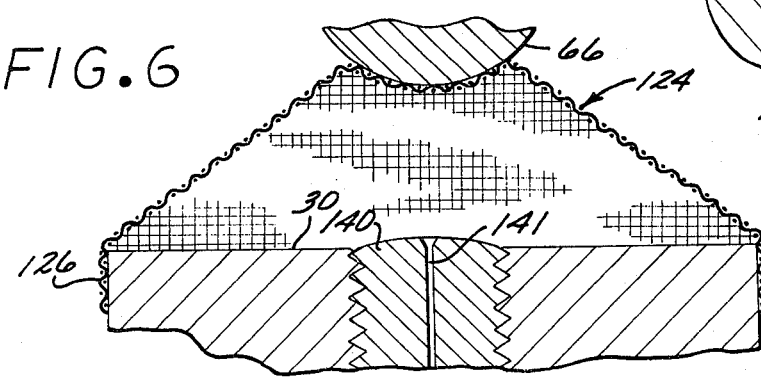
FIG. 6

OIL REFINER

BACKGROUND OF THE INVENTION

1. Field of the Invention

The present invention relates to by-pass oil refining devices for internal combustion engines. By-pass oil refining devices are coupled to the crankcase of an internal combustion engine in an alternative path of lubricating oil flow in automotive vehicles and other machines employing internal combustion engines. Such oil refiners percolate oil through a porous filter material and heat the oil to vaporize and remove volatile contaminants, such as water and fuel.

2. Description of the Prior Art

Contaminated lubricating oil used in internal combustion engines and other equipment is a principal cause of excessive wear and deterioration of engine parts and related equipment. At present, most internal combustion engines presently employ only a conventional mechanical filter for extracting materials such as dirt, carbon, soot, metal particles, and other similar foreign matter from lubricating oil. Liquid contaminants such as condensates, water and fuel, are often emulsified in the lubricating oil and cannot be separated by a conventional filter. It is therefore necessary for the lubricating oil of internal combustion engines using such conventional filters to be changed at regular intervals in order to minimize engine damage by contaminants entrained therein.

In recent years the increasing worldwide price of petroleum products has made it imperative for refining systems to be developed which will recondition lubricating oil so that it may be used and reused indefinately. In this way only small amounts of additional lubricating oil are required by engine usage.

The problem of liquid contaminants has been recognized, and some efforts have been made to develop devices which use heat as a mechanism for separating oil and contaminants. Exemplary prior art devices of this type include Schwalge, U.S. Pat. Nos. 2,635,759; 2,785,109 and 2,839,196; Barrown, U.S. Pat. No. 3,550,781; Priest, U.S. Pat. Nos. 3,616,885; and 4,006,084; and Forsland, U.S. Pat. No. 4,146,475.

These prior art devices have a number of features in common. All involve the percolation of contaminated engine oil through a porous filter, such as cotton or felt padding to remove solid contaminants from lubricating oil. The oil is then forced upwardly through one or several vertical ducts or tubes to a heated vaporization chamber, which is maintained at a pressure reduced from the pressure in the ducts or conduits. When oil emanates from the ducts into this vaporization chamber, the reduced pressure and the heat externally applied to the vaporization chamber by a heating element vaporize the more volatile contaminants, such as fuel and water. The lubricating oil then flows from a vaporization plate to an outlet for recirculation to the lubricating oil pumping system.

Certain problems have existed in all prior by-pass oil refining devices. All conventional oil refining devices are designed to separate both solid and volatile contaminants from lubricating oil. All prior devices apply heat to a vaporization chamber in order to vaporize the volitile contaminants and separate them from the lubricating oil. However, the systems devised for this purpose are inadequate to satisfactorily achieve this separation through vaporization. In conventional systems oil is directed upwardly through ducts in a vaporization plate to a vaporization chamber. In some by-pass oil refining devices the oil is forced under pressure upwardly through a central duct and discharged to strike a concave dome of the oil refiner roof within which a heating element is disposed. In the prior art devices the oil then cascades in rivulets and sheets down the tiers of a vaporization plate while being heated from above by an electrical resistence heater. However, conventional arrangements for discharge of oil into a vaporization chamber do not effectuate adequate removal of vaporizable contaminants. The oil in the jet streams or rivulets in prior art devices is not thin enough to allow heat applied thereto to vaporize volatile components to a satisfactory extent.

Another deficiency of prior art by-pass oil refining devices is that the filter element for filtering solid contaminants from the oil can be removed and replaced only with considerable difficulty. In one type of device, such as that described in U.S. Pat. No. 4,006,084, the casing must be constructed with interiorly directed lugs. A vaporization plate is equipped with notches corresponding to the spacing of the lugs so that the vaporization plate can be forced downward and twisted so that the vaporization clears the lugs at the notches when the vaporization plate is inserted into the case, but the periphery of the vaporization plate between the radial notches is entraped beneath the lugs. A center bolt, captured by the vaporization plate, protrudes upwards and is used to secure a lid to the by-pass refiner through the use of a wing nut.

U.S. Pat. No. 4,146,475, on the other hand, employs a plurality of bolts which the casing is tapped to receive. The bolts extend into the casing and hold the casing together. Numerous other inter-engaging arrangements are employed by means of which the several parts of the by-pass oil refiner can be separated and the porous filter removed and replaced.

All conventional releasable fastening mechanisms are unsatisfactory for a variety of reasons. The system of U.S. Pat. No. 4,006,084 requires considerable compressive and torsional forces on a vaporization plate which is always extremely slippery with lubricating oil when the porous filtering material is to be replaced. Furthermore, the notches in the vaporization plate provide paths of low resistance through the porous filtering material. Oil under pressure in the by-pass oil refiner tends to form "channels" through the porous filtering material directed toward the nut cutout notches in the vaporization plate. This severely reduces the efficiency of contaminant removal by the porous filtering material. Furthermore, fibers from the porous filter are introduced into the decontaminated oil as that oil is passed back to the engine crankcase. In addition, the porous filter compacts with vibration of the engine with which it is used so that the vaporization plate and lid attached thereto can twist and come loose.

Another disadvantage of some of the prior art devices is that oil is introduced through the bottom of the by-pass oil refiner. As a result, oil tends to drain back through the porous filter material back into the inlet when the engine is idle, and thereby dislodge the entrapped contaminants from the lower portions of the porous filtering material and carry these contaminants back to the engine crankcase. This significantly increases the concentration of contaminants in the oil in the crankcase.

In other devices, such as that described in U.S. Pat. No. 4,146,475, oil is introduced laterally and flows downwardly to beneath the porous filtering material. The vaporization plate necessary to allow such flow required extensive machining, including a double boring operation which involves drilling intersecting bores at right angles to each other through the cast vaporization plate in order to achieve a passageway by means of which oil can be introduced into the bottom of the refiner unit.

A further disadvantageous feature of prior art devices is that all conventional devices employ an open vent. Because of vibration and movement of the automotive vehicle, oil frequently escapes from the oil refiner through the vent. Furthermore, because of the open vent and the conventional arrangement of fastening the component parts of the oil refiner together, all conventional oil refiners must be operated in a vertical position.

SUMMARY OF THE INVENTION

The present invention is an improved by-pass oil refining device for internal combustion engines. The improved oil refiner has a stationary upper portion and a removable lower portion. Contaminated oil enters the stationary upper portion of the refiner through an oil inlet that communicates with a pressure chamber, which is a cavity located directly beneath a vaporization plate. Unlike conventional devices, this arrangement allows the contaminated oil, coming from the engine crankcase, to heat the vaporization plate from beneath. This added heat raises the temperature on the vaporization plate, which is also heated by an electrical resistance heating element from above. By heating the vaporization plate from both above and below, efficiency of vaporization of volatile contaminants is enhanced.

From the pressure chamber of the improved oil refiner of the invention the contaminated oil is forced down and around the outside of a disposable filter cartridge which has a floor with apertures spaced thereacross and which contains porous filtering material. The disposable cartridge is positioned within an outside permanent cup-shaped lower portion of the oil refiner casing. This lower portion includes an annular flange about its upper perimeter which flange is captured by a retaining ring that is secured by a cup screw fastening arrangement to the stationary upper portion of the oil refiner case. Because pressure is maintained on the contaminated oil by the oil pump through the pressure chamber, the oil is forced down and around the outside of the filter cartridge and up through the apertures in the floor of the filter cartridge. The oil is then forced through a cotton media, removing the bulk of liquid contaminants, solid matter, carbon and soot. The partially decontaminated oil is then passed through a polish micron filter, a polish felt filter, and then a final polish micron filter, to remove solids having a dimension of three microns or more. The oil then enters a one-eighth inch diameter duct which extends from the bottom of a base plate beneath the pressure chamber up through the vaporization plate in isolation from the pressure chamber.

At the raised center of the vaporization plate, the oil passes through a still smaller restriction in the duct which has a diameter of only several thousandths of an inch. This restriction in the duct governs the flow of oil, along with an adjustable needle valve in the oil pump. Because the oil is under pressure and the upper extremity of the duct is restricted, the oil emanates from the duct at the top of the vaporization plate under augmented pressure. The oil emanates as a jet which strikes a convex, rounded ball-shaped protrusion extending convex downward from the lid of the refiner unit. Also, at the termination of the duct at the center of the vaporization plate there is an atomizing screen that extends from the vaporization plate to the rounded ball-shaped protrusion. The spray of oil, striking the convex shape, is deflected laterally through the atomizing screen at a suddenly reduced pressure. The oil is thereupon atomized into the higher temperature, preheated, reduced pressure vaporization chamber, thereby causing the immediate vaporization of any remaining volatile liquid contaminants. The vaporized contaminants are vented through a ball check valve in the vent on the lid of the oil refining unit.

The vaporization chamber is heated by a resistance heater mounted in a dome in the lid. The wattage and voltage of the electric heater are variable, depending upon use.

The vaporization plate itself has a raised center with a plurality of concentric, descending tiers, the peripheries of which are configured to define partial spiral inclines. These inclines guide the liquid oil cascading down the tiers into downward spiral paths of flow, thus prolonging the time during which the oil remains in the heated vaporization chamber, and further enhancing vaporization of contaminants. Upon reaching the lower rim of the vaporization plate, the decontaminated oil is drained through an outlet back to the engine crankcase.

The vent in the oil refiner lid includes a valve housing in which a vent passageway is defined. The vent passageway has a lower vent inlet port in communication with the vaporization chamber and an upper vent exhaust port. A buoyant stopper or valve element, in the form of a sphere, is positioned in the vent passageway to block the vent inlet port unless pressure in the vaporization chamber exceeds ambient external pressure. This prevents ambient air, which typically contains at least some moisture, from being sucked into the oil refining unit, as would occur, especially, when the internal combustion engine is turned off. The buoyant stopper also blocks the exhaust port when liquid in the vent passageway floats the buoyant stopper to the level of the exhaust port. This prevents oil from spilling out through the exhaust port of the vent.

The releasable attachment of the lower portion of the refiner casing allows for easy removal and replacement of the disposable filter cartridge. All of the inlet and outlet connections are in the stationary upper portion, so that once the retaining ring surrounding the lower portion of the casing is loosened, the cup-shaped lower portion of the casing can be dropped, and the filter cartridge replaced. The lower portion of the casing is returned to its position in alignment with the upper portion and the retaining ring is re-engaged. A coil spring positioned in the bottom of the lower portion of the casing is compressed when the upper and lower casing portions are engaged. The spring forces the filter cartridge away from the floor of the lower portion of the casing and into sealed engagement with the base plate. This prevents oil from following a path around the porous, cotton filtering medium. Instead, all of the oil is forced from beneath upwardly and evenly across the cross-section of the filter cartridge.

The invention may be described with greater clarity and particularily by reference to the accompanying drawings.

DESCRIPTION OF THE DRAWINGS

FIG. 1 is a perspective view of the oil refiner of the invention.

FIG. 2 is a cross-sectional elevational view taken along the lines 2—2 of FIG. 1.

FIG. 3 is a sectional plan view taken along the lines 3—3 of FIG. 2.

FIG. 4 is a sectional plan view taken along the lines 4—4 of FIG. 2.

FIG. 5 is a sectional elevational detail taken along the lines 5—5 of FIG. 4.

FIG. 6 is a sectional elevational detail taken along the lines 6—6 of FIG. 2.

FIG. 7 is a sectional elevational detail taken along the lines 7—7 of FIG. 2.

FIG. 8 is an enlarged detail illustrating attachment of the upper and lower casing portions, indicated by the designation 8 in FIG. 2.

FIG. 9 is an enlarged detail illustrating attachment of the lid in the upper casing portion, indicated by the designation 9 in FIG. 2.

DESCRIPTION OF THE EMBODIMENT

With reference to FIG. 1, a by-pass oil refiner 10 is provided for an internal combustion engine. The oil refiner 10 has a casing 12 having an upper portion 14. As illustrated in FIG. 2, the upper portion 14 of the casing 12 includes an annular collar 15 which encircles a hollow vaporization chamber, indicated at 16. A fitting 20 fits into a lateral oil inlet 19 on one side of the collar 15, and a fitting 22 fits into a lateral oil outlet 21 in the oppossite side of the collar 15. The upper portion 14 of the casing 12 also includes a lid 24 which contains an arcuate electrical heating element 26 for heating the vaporization chamber 16. On the lid 24 there is a vent within a valve housing 18.

Within the confines of the upper portion 14 a vaporization plate 28 is provided and is elevated at its central portion, indicated at 30. The vaporization plate 28 has external radially descending tiers 32, 34 and 36 defined thereon. The vaporization plate 28 defines a pressure chamber 38 at its underside. A base plate 40 is located beneath the pressure chamber 38 and has a central, upright stem which has tapped female coupling 42 in cooperative threaded engagement with a male coupling 44 on the stud depending downward beneath the central portion 30 of the vaporization plate 28. Together the couplings 42 and 44 define an upright duct 46 which passes through the pressure chamber 38 in isolation therefrom. The duct 46 communicates with the vaporization chamber 16.

A removable filter cartridge 48 is positioned within the casing 12 beneath the base plate 40 and in communication with the duct 46. The removable filter cartridge 48 is of a generally drum-shaped configuration and has a floor 50 with apertures 52 therein spaced across the expanse of the floor. The filter cartridge 48 is filled with a porous filtering material, preferably cotton, indicated at 54.

The casing 12 includes a cup-shaped lower removable portion 56 with a radially extending annular flange 58 at its mouth. The casing 12 defines an annular flow passageway between the interior surface of the lower removable cup-shaped portion 56 and the upright, cylindrical wall 98 of the filter cartridge 48. This passageway leads to the underside of the floor 50 of the filter cartridge 48.

The collar 15 of the upper portion 14 of the casing 12 is formed as a steel casting. The lid 24 is in the form of a generally disc-shaped cap that extends across the upper opening of the collar 15. The lid 24 has an annular channel defined in its underside to receive the electrical resistance heating element 26, which is maintained in the channel by an arcuate retaining gasket 62. The underside of the lid 24 defines a dome 64 which is generally concave, but which has a downwardly depending, bulbous protrusion 66 at its center.

The periphery of the lid 24 is a turned-over rim 68, which has an under-turned lip 70, which is discontinuously turned upwardly at spaced intervals to define ramp-like inclines. The lid detail is depicted in FIG. 9.

At its upper extremity, the cylindrical collar 15 has defined thereon outwardly turned lugs 76, which are captured by the in-turned flange 70 of the lid 24. The lip 70 of the cap 24, with the inclined ramps defined thereon, engages the lugs 76 of the collar 60. That is, when the cap 24 is positioned atop the collar 60 and turned in a clockwise fashion, as viewed from above, the lugs 76 ride on the inclined ramps, thereby drawing the cap 24 downward to compress an annular gasket 78 to effectuate a liquid and a vapor-tight seal between the cap 24 and the collar 60.

The tiered vaporization plate 28 is unitarily formed with the surrounding annular collar 15. The oil inlet 19 is defined through the structure of both the collar 15 and the tiered vaporization plate 28 to provide a path of communication for oil from an inlet tube 72 to the pressure chamber 38 in isolation from the vaporization chamber 60.

The lower portion 56 of the casing 12 is a generally cup-shaped structure with an annular flange 58 at its mouth. A central, depending axial well 80 is defined at the center of the cup-shaped removable lower portion 56 of the casing 12. A compressed coil spring 82 resides in registration in the well 80 and bears upwardly against the floor 50 of the filter cartridge 48.

Above the cotton filter 54, there are several layers of filtering media having interstices of fine, selected dimensions. Two layers 84 and 86 of polish micron filter paper are separated by a layer 88 of felt. At the center of the filter cartridge 48 there is an upwardly concave screen 90 centered axially in the filter cartridge 48. An annular lid 92 is positioned atop the micropaper layer 86 and is held to the upright walls 98 of the filter cartridge 48 by a turned-over lip 100. A cork gasket 102 resides at the inner periphery of the lid 92. The coil spring 82 biases the filter cartridge 48 upwardly, driving the interior circular perimeter of the lid 92 into the cork gasket 102 and effectuating a liquid-tight seal between the filter cartridge 48 and the base plate 40.

The collar 15 has, at its lower extremity, outwardly turned lugs 104, best depicted in the detail of FIG. 8. An annular retaining ring 106 is provided about the casing 12 and encircles the flange 58 of the removable lower portion 56 of the oil refiner casing 12. The retaining ring 106 are configured to define partial spiral inclines, indicated at 114, 116 and 118. As previously noted, the vaporization plate 28 is unitarily formed with the cylindrical casing collar 15. The underside 120 of the vaporization plate 28 is preferably a frusto-conical surface, as depicted in FIG. 2, and defines the pressure chamber 38 therebeneath.

The base plate 40 is a generally annular structure having an upwardly projecting central, axial female stem with the fastener 42 therein. Four apertures 122 in the annular portion of the base plate 40 allow oil from the inlet 19 in the casing 12 to flow downwardly around the outside cylindrical wall 98 of the filter cartridge 48. The base plate 40 and the vaporization plate 28 are threadably engaged by the threaded connectors 42 and 44 so that the duct 46 is isolated from the pressure chamber 38.

At the top of the central portion 30 of the vaporization plate 28 there is a generally frusto conical shaped atomization screen 124, depicted in detail in FIG. 6. The screen 124 has a cylindrical skirt 126 that extends down the outside surface of the central portion 30. When the lid 24 is in position, as indicated in FIG. 2, the downwardly depending convex protrusion 66 of the lid 24 bears against the atomization screen 124, and the apex of the atomization screen 124 is configured with an arcuate depression therein to receive the protrusion 66. The upper extremity of the duct 46 is enlarged and internally tapped to receive a threaded bushing 140 in threaded engagement therewith. The bushing 140 has a very restricted central axial orifice 141 therethrough only 0.040 inches in diameter. As oil is forced upward in a jet through the duct 46 and the constricted orifice 141, it strikes the upper portion of the atomization screen 124 and the convex protrusion 66, and is deflected radially has an upper discontinuous, radially inwardly directed lip 108, which is deformed to define a plurality of inclined ramps. The retaining ring 106 is used to secure the cup-shaped lower casing portion 56 to the collar 15 of the upper casing portion 14 by placement in encircling arrangement about the lower portion 56 of the casing 12 against the flange 58. The retaining ring 106 is pressed upwardly so to clear the lugs 104 on the collar 15, which pass between the discontinuities in the lip 108 of the retaining ring 106. The retaining ring 106 is then twisted so that the inclined ramps defined on the lip 108 of the retaining ring 106 coact with the lugs 104 on the collar 60. This draws the retaining ring 106 upwardly, carrying with it the flange 58 on the lower portion 56 of the casing 12.

A quad ring 110, which is an annular rubber ring configured similarly to an O-ring, but with a rectangular cross section, is positioned in abutment with the edge of the mouth of the lower portion 56 of the casing 12 and fits into an annular channeled recess on the interior surface of the edge of the collar 15 radially interiorly of the lugs 104. As the retaining ring 106 is twisted into securement with the lugs 104 of the collar 15, the quad ring 110 is compressed to effectuate a fluid-tight seal between the lower portion 56 and the collar 15 of the upper portion 14 of the casing 12. The lugs 104 of the collar 15 of the upper casing portion 14 and the retaining ring 106 define a cup screw connection, of the type used to secure the lid 24 to the top of the collar 15.

The vaporization plate 28 is formed with a raised center 30 and with a plurality of coaxial annular tiers or terraces 32, 34 and 36. As illustrated in FIGS. 4 and 5, the peripheries of the center tier 30 and the annular tiers 32, 34 and 36 outwardly through the interstices in the frusto-conical walls of the atomization screen 124. The convex protrusion 66 aids in the lateral dispersion of the oil through the atomization screen 124 into the vaporization chamber 16.

FIG. 7 illustrates the vent 18 which is formed of a valve housing 134 that encompasses a check valve associated with the vent 18 to allow vapor to escape from the vaporization chamber 16 and to maintain the vaporization chamber 16 at at least ambient atmospheric pressure. The valve housing 134 is threadably engaged in the lid 24 atop the casing 12. An elbow-shaped vent passageway 136 is defined within the valve housing 134 and has a lower vent inlet port 138 in communication with the vaporization chamber 16 and an upper vent exhaust port 140. A buoyant stopper, in the form of a nylon sphere 142 is positioned in the vent passageway 136 to block the vent inlet port 138 unless pressure in the vaporization chamber 16 exceeds ambient external pressure. The sphere 142 also blocks the exhaust port 140 when liquid in the vent passageway 136 floats the sphere 142 to the level of the exhaust port 140, at the upper extremity of the vent passageway 136. Accordingly, oil cannot escape from the vent 18 even when the oil refiner 10 is tipped or when oil floods the vaporization chamber 16.

It should be noted that the oil refiner 10 requires no nuts, bolts, or wing nuts for assembly, nor are any lugs necessary to hold the filter cartridge 48 in position within the casing 12.

In the operation of the by-pass oil refiner 10, heated contaminated oil is directed from an inlet tube 72 into an oil inlet 19 in the collar 15 of the stationary upper portion 14 of the casing 12. The oil flows into the pressure chamber 38, where it is in contact with the underside 120 of the vaporization plate 28. The hot, contaminated oil thereby serves to aid in heating the vaporization plate 28. The contaminated oil then passes down through the four spaced apertures 122 in the base plate 40 to flow evenly across the lid 100 of the filter cartridge 48. The cork gasket 102 prevents oil from bypassing the filter cartridge 48 and flowing up through the duct 46. The contaminated oil flows in the annular space defined between the cup-shaped lower portion 56 of the oil refiner casing 12 and the cylindrical wall 98 of the filter cartridge 48 to the bottom of the lower casing portion 56.

Because it is under pressure from the oil pump, the oil then flows upwardly through apertures 52 in the floor 50 of the filter cartridge 48 evenly throughout the cross-section of the cotton filter 54 therein. Many of the solid and liquid contaminants in the oil are removed in the cotton filter 54. As the oil passes upward, more contaminants are removed when the oil flows through the micropaper layers 84 and 86 and the felt filter 80 therebetween and through the screen 90 into a cavity beneath the duct 46. The oil is under pressure due to the constriction of the duct 46, which is preferably only one-eighth of an inch in diameter. At the top of the duct 46 the constricted orifice 141 in the bushing 140 further restricts the flow of oil and increases pressure beneath the screen 124. Consequently, the oil is ejected upward from the duct 46 as a jet, striking the convex protrusion 66, which disperses the oil radially outwardly through the atomizing screen 124 to break the oil up into tiny droplets. As the oil leaves the duct 46, there is a sudden decrease in pressure, since the oil is no longer flowing through a constriction. The pressure in the vaporizing chamber 16 is much lower than the pressure in the duct 46. Also, the electrical resistance heating element 26 and the heat imparted to the vaporization plate 28, along with the reduced pressure, serve to vaporize liquid contaminants remaining in the oil. These vaporized contaminants are expelled through the vent 18.

As long as pressure in the vaporization chamber 16 remains above ambient atmospheric pressure, the expelled vapors are free to flow to the vent inlet port 138 through the vent passageway 136 to the vent outlet port 140. Should the pressure of the vaporization chamber 16 fall to atmospheric pressure, however, the nylon sphere 142 will drop to block the vent port 138 and prevent ambient air from being sucked into the vaporization chamber 16. Should a vaporization chamber 16 become flooded with oil, the nylon sphere 142 will float and plug the exhause port 140 to prevent loss of oil through the vent 18.

The atomized droplets of oil collect on the vaporization plate to reform as a liquid and fall as a liquid cascade from the center portion 30 of vaporization plate 28 down the tiers 32, 34 and 36. The helical inclines 114, 116 and 118 at the periphery of the tiers guide the oil into downward spiral paths of flow. Ultimately, the oil is discharged from the casing 12 through the lateral outlet 22 defined in the collar 60.

Because the collar 60 and vaporization plate 28 is constructed as a unitary structure, the vaporization plate 28 extends across the entire breadth of the interior of the cylindrical collar 60 to form a barrier to separate the oil inlet 19 and the oil outlet 21 on opposite sides of the barrier.

To service the upper portion 14 of the oil refiner 10, to replace the gasket 78, or to check the atomizing screen 124, the lid 24 is merely twisted to disengage the inclined ramps defined on the lip 70 from the lugs 76, whereupon the lid 24 can be removed from the collar 15. Similarly, to replace the filter cartridge 48, the retaining ring 106 is twisted to disengage the discontinuous lip 108 thereof from the lugs 104 at the lower extremity of the collar 15. This allows the lower portion 56 of the oil refiner 10 to be removed so that the filter cartridge 48 can be replaced. The old filter cartridge 48 is merely lifted from the cup-shaped lower portion 56 of the casing 12, and a new, replacement filter cartridge 48 is inserted in its place. The flange 58 of the lower portion 56 of the casing 12 is then repositioned into abutment with the quad ring 110, and the retaining ring 106 is re-engaged with the lugs 104 of the collar 60. The oil refiner 10 is thereupon ready for reuse.

Undoubtedly, numerous variations and modifications of the invention will become apparent to those familiar with oil refiners. Accordingly, the scope of the invention should not be limited to the specific embodiment depicted and described, but rather as defined in the claims appended hereto.

I claim:

1. In an oil refiner for an internal combustion engine including a casing having an upper portion defining a vaporization chamber with a vent and an oil outlet in said casing in communication with said vaporization chamber, an electrical heating element for heating said vaporization chamber, a vaporization plate elevated at its center and having radially descending tiers thereon beneath said vaporization chamber and defining a pressure chamber at its underside, a baseplate beneath said pressure chamber in cooperative arrangement with said vaporization plate to define a duct that extends through said pressure chamber in isolation therefrom to communication with said vaporization chamber, the improvement comprising a removable filter cartridge having a floor with apertures spaced thereacross and containing porous filtering material therein positioned within said casing beneath said baseplate in communication with said duct, and said upper portion of said casing is stationary and said casing has a lower removable portion and an oil inlet in said upper stationary portion to said pressure chamber, at least one outlet in said baseplate to flow oil to the lower removable portion of the casing and said lower removable portion of the casing a flow passageway to the underside of said filter cartridge.

2. An oil refiner according to claim 1 in which said flow passageway is the space between said lower removable portion of said casing and said filter cartridge.

3. An oil refiner according to claim 2 further comprising a spring interposed between said lower removable portion of said casing and said filter cartridge to bias said filter cartridge toward said baseplate.

4. An oil refiner according to claim 1 in which said filter cartridge includes, above said porous filtering material, layers of micropaper, separated by a layer of felt, and an annular lid thereabove and an upwardly concave screen centered within said lid directly beneath said duct.

5. An oil refiner according to claim 1 in which both said upper and lower portions of said casing have radially outwardly directed protrusions, and further comprising a retaining ring which entraps said protrusions and releasably secures said upper and lower casing portions together.

6. An oil refiner according to claim 5 in which said protrusion of said upper casing portion and said retaining ring define a cup screw connection.

7. An oil refiner according to claim 1 in which said upper portion of said casing is formed by a cylindrical collar and a cap that extends thereacross which is secured to said collar by a cup screw connection.

8. An oil refiner according to claim 7 in which said vaporization plate is unitarily formed with said cylindrical casing collar and said oil inlet is defined therethrough to provide a passage from externally of said casing to said pressure chamber in isolation from said vaporization chamber.

9. An oil refiner according to claim 1 in which said vaporization plate is formed with a plurality of coaxial, annular tiers, and portions of the peripheries of said tiers are configured to define partial spiral inclines.

10. An oil refiner according to claim 1 further comprising an atomizing screen located at the upper extremity of said duct, whereby oil under pressure is dispersed into said vaporization chamber through said atomizing screen.

11. An oil refiner according to claim 10 in which said casing includes a dome that has a downwardly directed convex protrusion, and the upper extremity of said atomizing screen is configured to receive said convex protrusion, whereby said convex protrusion aids in lateral dispersion of said oil through said atomizing screen into said vaporization chamber.

12. An oil refiner according to claim 1 further comprising a check valve associated with said vent to allow vapor to escape from said vaporization chamber and to maintain said vaporization chamber at at least ambient pressure.

13. An oil refiner according to claim 12 in which said vent includes a valve housing mounted atop said casing and in which a vent passageway is defined having a lower vent inlet port in communication with said vaporization chamber and an upper vent exhaust port, and a buoyant stopper is positioned in said vent passageway to block said vent inlet port unless pressure in said vaporization chamber exceeds ambient external pressure, and to block said exhaust port when liquid in said vent passageway floats said buoyant stopper to the level of said exhaust port.

14. A device for removing solid and vaporizable contaminants from engine oil comprising: a casing having a removable concave lower portion having an upwardly opening mouth with radially outwardly directed flange means thereon, a stationary upper portion including a cylindrical collar with an oil inlet thereto and an oil outlet therefrom and fastening means defined on its upper and lower extremities, a lid having a vapor vent thereon and an electric heating element therein with fasteners defined at the periphery thereof for direct fluid-tight engagement with said fastening means defined at the upper extremity of said cylindrical collar, a vaporization plate extending across the entire breadth of the interior of said cylindrical collar to form a barrier to isolate said oil inlet and said oil outlet from each other on opposite sides of said barrier, and said vaporization plate has a raised center with a plurality of descending tiers defined in concentric fashion about said center, a baseplate located beneath said vaporization plate and cooperatively arranged with said vaporization plate to define an upright duct leading to said center of said vaporization plate, at least one outlet in said baseplate to define at least one oil passageway to said lower removable protion of said casing from said oil inlet, a retaining ring encircling said removable lower portion of said casing and engageable with said fastening means at the lower extremity of said cylindrical collar to entrap said flange means of said lower casing portion and to releasably seal said upper and lower casing portions together, a disposable filter cartridge containing porous filtering material therein, located within said lower portion of said casing and means for maintaining said disposable filter cartridge in sealed communication with the lower extremity of said upright duct and in open communication with said oil inlet to said casing to direct the flow of oil from said casing inlet through said filter cartridge to said upright duct.

15. A device according to claim 14 wherein said vent has means for preventing gas flow into said casing and for preventing liquid flow out of said casing.

16. A device according to claim 14 further comprising means atop said upright duct for atomizing and laterally deflecting oil rising from said duct.

17. A device according to claim 14 wherein peripheries of said tiers of said vaporization plate are configured to guide cascading oil into downward spiral paths of flow.

18. A device according to claim 14 in which said vaporization plate and said baseplate define a pressurized cavity therebetween, and said oil inlet is in communication with said pressurized cavity, whereby oil flows through said pressurized cavity to reach said disposable filter cartridge.

* * * * *